F. H. STACEY.
COLLAR.
APPLICATION FILED FEB. 25, 1910.
971,700.
Patented Oct. 4, 1910.
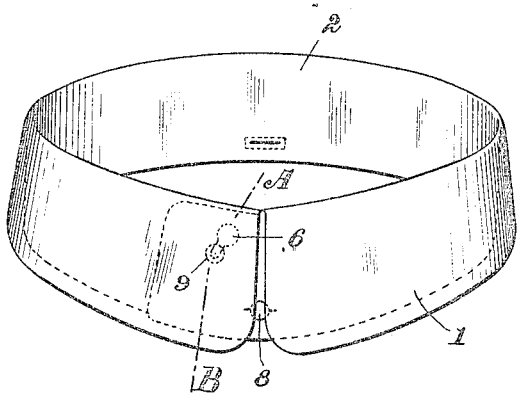
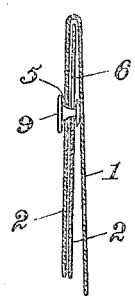
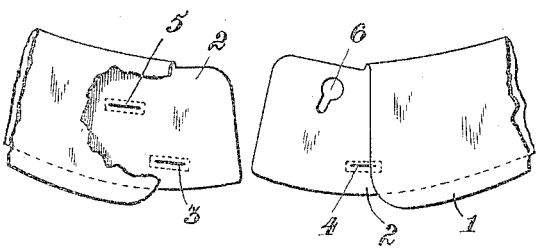
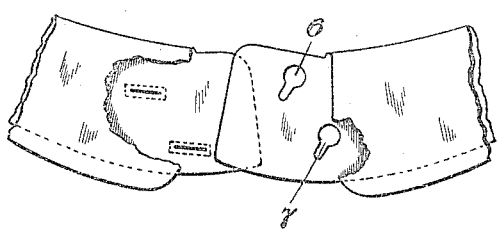
Witnesses.
H. Davis
P. Shee
Inventor.
F. H. Stacey
By [attorney signature]
Atty

UNITED STATES PATENT OFFICE.

FREDERICK HAROLD STACEY, OF MONTREAL, QUEBEC, CANADA.

COLLAR.

971,700.          Specification of Letters Patent.          Patented Oct. 4, 1910.

Application filed February 25, 1910. Serial No. 545,902.

*To all whom it may concern:*

Be it known that I, FREDERICK HAROLD STACEY, a resident of Montreal, Canada, at 4 Hospital street, have invented certain new and useful Improvements in Collars; and I do hereby declare that the following is a full, clear, and exact description of the same.

The invention relates to improvements in collars, as described in the present specification and illustrated in the accompanying drawings that form part of the same.

The invention consists essentially in locking the collar band of a double collar above the ordinary stud holes by a stud inserted through a particular form of stud holes.

The objects of the invention are to retain the neat appearance of the collar, especially at the top front where usually the points spread and present an untidy appearance, and generally to accomplish this purpose in a simple and effective manner.

In the drawings, Figure 1 is a perspective view of a collar showing the band and locking means in dotted lines. Fig. 2 is a detail of the front of the collar showing the parts broken away. Fig. 3 is a cross sectional view of the collar through the locking stud hole, on line A—B in Fig. 1. Fig. 4 is a detail of the front of the collar, showing the parts broken away and a double locking means.

Like numerals of reference indicate corresponding parts in each figure.

Referring to the drawings, 1 is the face of the collar folding over the band 2 as customary in double collars.

3 and 4 are the ordinary stud holes arranged adjacent to the lower end of the band as customary.

5 is a stud hole in one end of the band above the stud hole 3 and farther in from the end of the band than the said stud hole 3.

6 is a key shaped stud hole in the other end of the band nearer to the extremity of that end than the stud hole 4 and preferably in oblique arrangement, said key shaped stud hole having a substantially circular upper portion extending into an elongated slot.

In Fig. 4, the only difference in the collar is that in place of the ordinary stud hole 4, the key shaped slot 7 is used having the circular portion and the slot extending from said circular portion so that there will be a double lock to the collar when fastened.

8 is the stud inserted in the ordinary stud holes and 9 is the stud inserted in the locking stud holes.

In using this collar, in the forms shown in Figs. 1, 2 and 3, the stud 9 is inserted in the ordinary stud hole 3, the stud 8 in the stud hole 5, the other end of the band is then brought over as is customary in fastening the collar and the studs 9 inserted through the circular part of the key shaped stud hole 6 and then the band shoved upwardly, the stud 8 is then inserted through the stud hole 4 and the collar is securely fastened so that it will not part at the top front portion and besides is securely locked in that position.

In the form shown in Fig. 4, the operation of fastening the collar is almost similar, with the exception that the studs are inserted in the circular parts of the key shaped stud holes together and the band brought up so that the neck of the studs enter the slot portions to the said key shaped stud holes.

What I claim as my invention is:

A collar of the double collar style having toward the lower end and front exposed portion of the band, a stud hole and a second stud hole in the same end through the band completely covered by the face portion and in the other end of the band in the exposed portion toward the upper edge, a locking slot formed by a substantially circular opening from which extends a comparatively narrow slot in an oblique direction, said locking slot being adapted to receive a stud extending through the covered hole in the other end of the band, and a suitable stud hole in the same end of the band as the locking slot extending partially under the face and adapted to receive the stud from the other stud hole in the other end of the band and a locking slot of similar form to the aforesaid locking slot and extending toward the lower edge at the same end of the band adapted to receive the stud from the lower stud hole in the other end of the band.

Signed at the city of Belleville this fifth day of February 1910.

FREDERICK HAROLD STACEY.

Witnesses:
ETTA CROUTER,
RICHARD D. PONTON.